United States Patent Office 2,730,373
Patented Jan. 10, 1956

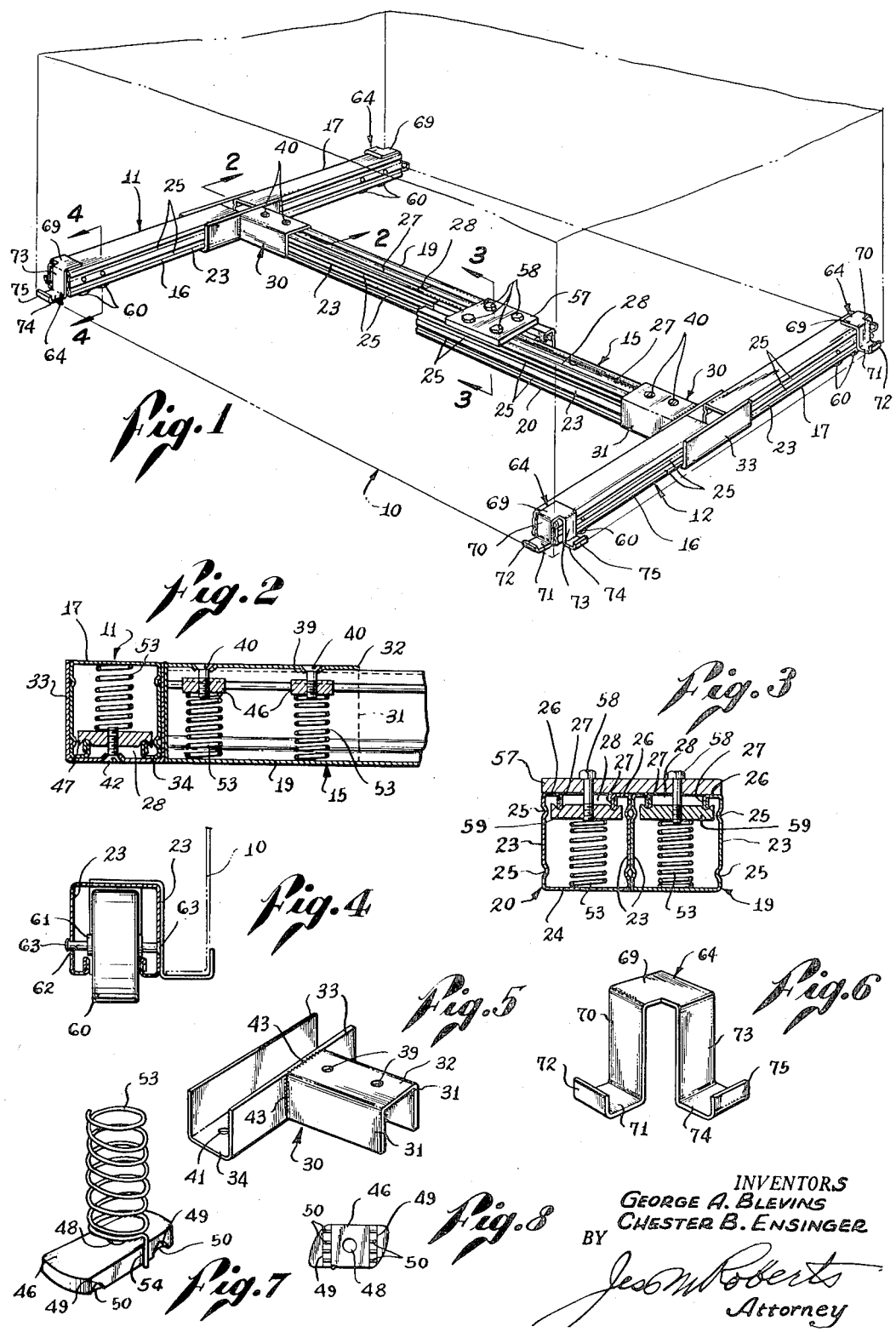

2,730,373

ADJUSTABLE DOLLY FOR KITCHEN STOVES AND THE LIKE

George A. Blevins, Burbank, and Chester B. Ensinger, Woodland Hills, Calif.

Application March 2, 1953, Serial No. 339,648

7 Claims. (Cl. 280—35)

This invention relates to dollies for lending mobility to relatively heavy household devices such as kitchen stoves, refrigerators or the like, and is specifically directed to the construction of a dolly to be installed under such household devices for long periods of use.

Kitchen stoves, refrigerators and the like are so heavy and awkward to handle that they are commonly left in fixed position indefinitely. They present a problem, therefore, because it is exceedingly difficult to clean under and behind the devices, especially when close to the wall of a room. Of course, it is unwise for a housewife to attempt to move a heavy refrigerator or stove by her own strength.

The general object of the invention is to meet this problem by providing a dolly that is of inexpensive, adjustable construction and is, therefore, suitable for sale to householders as an accessory device to be installed under existing stoves and refrigerators.

One of the more specific objects of the invention is to provide a dolly of this type that has strength combined with a low weight and also is variable in two dimensions. Such a dolly may be adjusted to fit a particular household device, and when the household device is replaced, the dolly may be again adjusted to the dimensions of the replacement household device. While such adjustability may be achieved in various ways, the preferred practice of the invention is characterized by the use of lengths of hollow sections having longitudinal slots. To make possible adjustment of the dimensions of the dolly, the hollow sections are interconnected for relative longitudinal movement by interconnecting members that extend across the longitudinal slots. Screws extending inward from the interconnecting members through the longitudinal slots engage suitable anchoring elements inside the hollow sections to maintain the selected adjustments.

The preferred embodiment of the invention is further characterized by an H-shaped dolly frame comprising two parallel frame members in combination with a central interconnecting frame member, and each of the three frame members is made of longitudinal sections movable relative to each other for overall adjustment of the dolly to reach the four corners at the bottom of the household device. A feature of this embodiment is that each of the two parallel frame members is constructed for inherently stable weight-supporting engagement with the household device, and since each of the parallel frame members is functionally independent to this extent, the third central member functions merely as interconnecting means to space the two parallel members apart. Thus the third central frame member is not subject to high magnitude stresses, and, in fact, may be omitted in some practices of the invention.

It is a further object of the invention to provide a dolly that is unobtrusive and does not appreciably change the appearance of the supported household device. Modern kitchen stoves and refrigerators are characterized by a smooth, clean-cut appearance which is achieved largely by extending the four side walls of the device below its bottom wall to provide a rectangular skirt that extends to the floor and serves as a supporting base. This object of making the dolly inconspicuous is attained by what may be termed an under-slung dolly construction with the supporting wheels spacing the dolly frame close to the floor and with the dolly adapted to support the base skirt of the household device close to the level of the bottom of the dolly frame. Thus, with the dolly positioned inside the base skirt and with the base skirt extending down to at least approximately the bottom of the dolly frame, the dolly frame is completely concealed by the skirt; and with the dolly mounted on its wheels in an underslung manner, the bottom of the base skirt is desirably close to the floor.

Another object of the invention is to provide such an accessory dolly that may be handled and shipped in compact form. This object is attained by making the dolly frame of separate components that may be packaged as a compact knock-down kit requiring no special skill and no special tools for assembly by the purchaser.

The various objects, advantages and features of the invention will be apparent from the following detailed description considered with the accompanying drawing.

In the drawing, which is to be regarded as merely illustrative:

Fig. 1 is a perspective view of the presently preferred embodiment of the invention;

Fig. 2 is an enlarged section taken as indicated by the line 2—2 of Fig. 1;

Fig. 3 is a section taken as indicated by the line 3—3 of Fig. 1;

Fig. 4 is a section taken as indicated by the line 4—4 of Fig. 1;

Fig. 5 is a perspective view of a T-shaped connecting member incorporated in the construction shown in Fig. 1;

Fig. 6 is a perspective view on an enlarged scale of a support clip that may be employed at the four corners of the dolly frame;

Fig. 7 is a perspective view of an anchoring element and an associated spring that are incorporated in the preferred embodiment of the invention; and Fig. 8 is a bottom view on a reduced scale of the anchoring element shown in Fig. 7.

Fig. 1 shows the presently preferred embodiment of the invention in supporting engagement with the base skirt 10 of a household device such as a kitchen stove or refrigerator, the configuration of the base skirt being indicated by the light lines. The illustrated dolly structure includes two parallel frame members generally designated 11 and 12 and a central frame member generally designated 15 that interconnects the two parallel frame members. Each of the two parallel frame members 11 and 12 comprises two adjustably interconnected sections 16 and 17, and the central frame member comprises two adjustably interconnected sections 19 and 20.

These six sections making up the three adjustable frame members may all be cut from the same stock, which stock preferably is a hollow section of rectangular configuration having a longitudinal slot on one side. Thus, in the construction shown in the drawings, each of the sections 15, 16, 19 and 20 has two parallel side walls 23 (Fig. 3) interconnected by a third wall or web 24. Preferably each of the side walls 23 is formed with at least one longitudinal inward offset or inner rib 25, to lend stiffness to the structure. The fourth wall of this hollow section is formed by two longitudinal flanges 26, which, in turn, are formed with inwardly directed longitudinal flanges 27. These inward flanges 27 constitute the side walls of a longitudinal slot 28 on one side of the section. Preferably the hollow section is made of sheet metal, the longitudinal edges of which are turned back to double the thickness of the metal along the slot flanges 27 as shown.

The sections 16 and 17 of each of the two parallel side frame members 11 and 12 may be interconnected in any suitable manner and, moreover, may be connected to the third central frame member 15 in any suitable manner. A feature of the preferred embodiment of the invention, however, is the use of a T-shaped connecting member 30 for both of these purposes. As best shown in Fig. 5, the T-shaped connecting member 30 has a shank portion of U-shaped cross-sectional configuration formed by two side walls 31 together with an interconnecting wall or web 32 and has a head portion also of U-shaped configuration with side walls 33 and interconnecting wall or web 34. For the purpose of connection with the central frame member 15, the web 32 is formed with a pair of screw holes 39 to receive a pair of screws 40, and the web 34 in like manner is provided with a pair of screw holes 41 to receive a pair of screws 42.

It is contemplated that the two webs 32 and 34 of the T-shaped connecting member 30 will extend across the longitudinal slots 28 of the corresponding hollow sections of the frame members. In the present embodiment of the invention, the sections 19 and 20 of the central frame member 15 have their longitudinal slots facing upward, and the sections of the two parallel frame members 11 and 12 have their slots facing downward. Accordingly, the web 32 of the T-shaped connecting member 30 is uppermost, and the web 34 is at the underside as may by seen in Fig. 5.

It is apparent that the T-shaped connecting member 30 may be fabricated by interconnecting two short pieces of channel-shaped material by welding, as indicated at 43 in Fig. 5. Since, in this particular embodiment of the invention, the two sections 19 and 20 of the central frame member 15 are offset from each other in overlapping relation, the shank portions of the two T-shaped members 30 are correspondingly offset with respect to their head portions to centralize the central frame member 15. It is not necessary, however, to make separate right-hand and left-hand T-shaped members because the same offset configuration is applicable to both sides of the dolly frame.

The various screws 40 and 42 are adapted to cooperate with corresponding anchoring elements, each of which elements may be in the form of a metal block. Thus, the two screws 40 thread into corresponding metal blocks 46, and the two screws 42 thread into corresponding metal blocks 47.

The construction of these metal blocks may be understood by referring to Figs. 7 and 8 showing one of the metal blocks 46 with a central screw hole 48 and with two parallel grooves 49 on one face. The two grooves are spaced and dimensioned to register with and engage the two longitudinal flanges 27 that form the longitudinal slot in a frame section. Preferably the two grooves are formed with metal-engaging teeth 50 and yielding means is associated with each of the metal blocks to hold it in place in the absence of engagement by a retaining screw. As best shown in Fig. 7, such a yielding means may take the form of a coiled spring 53, one end 54 of which is suitably bonded to one side of the block 46 with the other end adapted to press against the inner surface of the frame section. Thus, the coiled spring 53 will urge the anchoring block 46 against the longitudinal flanges 27 with sufficient pressure to hold the anchoring block in place, but nevertheless permitting the anchoring block to be shifted manually as may be desired in the course of assembling the dolly frame.

The two sections 19 and 20 of the central frame member 15 may be connected together in any suitable manner permitting longitudinal adjustment of the two sections relative to each other. In the construction shown in the drawing, a connecting member 57 is provided for this purpose in the form of a plate dimensioned to extend across the top surfaces of the two sections 19 and 20. As best shown in Fig. 3, the connecting member 57 is provided with four screws 58, which, respectively, thread into spring-equipped anchoring blocks 59 identical with the previously described anchoring blocks 46 and 47.

The described H-shaped dolly frame may be provided with supporting wheels in any suitable manner. Preferably four pairs of supporting wheels or casters 60 are provided, each pair being mounted in and largely enclosed by one of the frame sections 16 or 17. Preferably each of the wheels 60 is provided with a suitable antifriction bearing 61 and is mounted on a suitable axle pin 62. As best shown in Fig. 4, each axle pin 62 may be mounted in corresponding apertures in the side walls 23 of the frame section and may be suitably held in place, for example, by peening 63, as shown.

It is to be noted that only a relatively small proportion of each wheel 60 extends below the bottom of the H-shaped frame so that the dolly frame is spaced close to the floor. Thus, the dolly frame may be aptly described as of underslung construction. It will be further noted that each wheel has a relatively broad flat tread, being as wide as the longitudinal slot permits.

The dolly frame may be adapted in any suitable manner for engagement with the base skirt 10 of a household device. For example, the dolly frame may be provided with four corner clips 64, positioned respectively at the opposite ends of the two side frame members 11 and 12. As best shown in Fig. 6, each of the clips 64, which may be made of suitably strong sheet material, may be of angular configuration with a first portion 69 resting on and welded to the top of the dolly frame and with a second portion 70 forming an outwardly extending support arm 71 that terminates in an upward flange 72.

It will be noted that the support arm 71, as well as the corresponding pairs of support wheels 60, lie on the longitudinal axis of the corresponding frame section. With the two support arms 71 thus centralized and in supporting contact with a substantial portion of the lower edge of the base skirt of the household device, each of the two side frame members 11 and 12 has a certain inherent stability of its own, any tendency of the side frame member to rock laterally being opposed both by the extensive engagement of the two support arms with the skirt and by the lateral extensive engagement of the support wheels with the floor. Preferably each of the corner clips 64 is also formed with a third portion 73, forming a second support arm 74, terminating in a retaining flange 75, so that the second supporting arm may also engage the skirt 10 to increase the inherent stability, as indicated in Fig. 4. As heretofore stated, the inherent stability of the two side frame members 11 and 12 makes it possible to use them independently without the interconnecting third member 15. In such a use, the shank portions of the T-shaped members may be omitted.

It is apparent that the described dolly may be partially or completely dismantled for shipment in a compact package and may be readily assembled by the purchaser without the exercise of special skill and without need for special tools. Merely separating the sections 16 and 17 from the corresponding T-shaped connecting members 30 permits shipment of the kit in compact form. Additionally separating the two sections 19 and 20 of the central frame member 15 permits shipment of the kit in even more compact form.

The kit is assembled merely by threading the various screws into the corresponding anchor blocks, and the assembled frame may be readily adjusted in dimension by temporarily loosening the appropriate screws and making the necessary relative adjustments. It is contemplated that the range of adjustment in dimension provided by the described construction will be sufficient for the vast majority of stoves and refrigerators. In some instances, some of the hollow sections of the dolly frame may be too long to permit the dolly to contract in dimension as required. In such instances, however, it is a simple matter to saw off excess portions of the frame sections.

Our description in specific detail of a preferred practice of the invention will suggest to those skilled in the art various changes, substitutions and other departures from our disclosure that properly lie within the spirit and scope of the appended claims.

Having described our invention, we claim:

1. A dolly for use under a household device such as a stove or refrigerator having a rectangular bottom skirt, said dolly being fabricated largely from a hollow section of noncircular cross-sectional configuration and comprising: Two lengths of said section adjustably interconnected for relative longitudinal movement to form a frame member to extend across one dimension of the rectangular space inside the skirt centrally of the space; two T-shaped connecting members having their shank portions mounted on the opposite ends respectively of said central frame member; two pairs of lengths of said section mounted on the four ends respectively of the two arms of said T-shaped connecting members to form therewith two parallel frame members to extend to the four corners of said space, at least one member of each of said pairs being adjustable relative to the corresponding T-shaped connecting member; supporting wheels journaled in said two parallel frame members; and means at the ends of said parallel frame members to engage and support said household device near the four corners of said skirt.

2. An adjustable dolly for lending mobility to a household device such as a kitchen stove or refrigerator having four vertical walls extending below a bottom wall to form a rectangular bottom space, said dolly having a first pair of members movable longitudinally relative to each other to adjustably span one dimension of said space adjacent one of said vertical walls; a second pair of members movable longitudinally relative to each other to adjustably span said one dimension of said space adjacent the opposite vertical wall; a pair of means connecting said two pairs of members together, said pair of means being adjustably connected together to vary the spacing between the two pairs of members in accord with the other dimension of said rectangular space, each of the members of said two pairs of members being of hollow construction with a longitudinal slot in one longitudinal wall of the member; means to adjustably interconnect the two members of each of said pairs of members thereby to form a frame to extend adjustably to the four corners of said bottom space, said interconnecting means comprising an interconnecting member overlapping the slots of the corresponding pair of members, anchor members inside the pair of members adjacent said slots, and screws extending from said interconnecting member through the slots in engagement with said anchor members; support wheels mounted on said frame; and means at the four outer ends, respectively, of said two pairs of members to engage the lower ends of said vertical walls to support the household device.

3. A dolly as set forth in claim 2 in which the interconnecting members for said two pairs of members, respectively, are two T-shaped members on the opposite ends respectively of said pair of means.

4. A dolly as set forth in claim 2 in which the slots of said two pairs of members are on their undersides and in which said supporting wheels are mounted in said underslots.

5. A dolly as set forth in claim 4 in which all of said hollow members are rectangular in cross-section and each of said four engaging means has a first portion mounted on the top of the corresponding hollow member and a second portion forming a supporting arm extending outward from the end of the corresponding hollow member near the level of the lower side of the hollow member in the plane of the supporting wheels on the hollow member.

6. A dolly as set forth in claim 5 in which each of said four engaging means has a second portion forming a laterally extending supporting arm at the same level as the first mentioned supporting arm.

7. A dolly for use under a household device such as a stove or refrigerator having a rectangular bottom skirt, comprising: two elongated members adjustably interconnected for relative longitudinal movement to form an extensible frame means to extend across one dimension of the rectangular space inside the skirt centrally of the space; two T-shaped connecting members having their shank portions mounted on the opposite outer ends respectively of said two elongated members; two pairs of lengths of a hollow section of non-circular cross-sectional configuration mounted on the four ends respectively of the two arms of said T-shaped connecting members to form therewith two parallel frame members to extend to the four corners of said space, at least one member of said pairs being adjustable relative to the corresponding T-shaped connecting member; supporting wheels journaled in said two parallel frame members; and means at the ends of said parallel frame members to engage and support said household device near the four corners of said skirt.

References Cited in the file of this patent

UNITED STATES PATENTS

| | | |
|---|---|---|
| 175,259 | Selman | Mar. 28, 1876 |
| 1,383,462 | Gillette | July 5, 1921 |
| 1,700,009 | Willner, Sr. | Jan. 22, 1929 |
| 1,853,318 | Peters | Apr. 12, 1932 |
| 1,887,067 | Pehrsson | Nov. 8, 1932 |
| 2,480,025 | Hunter | Aug. 23, 1949 |